(12) United States Patent
Sharifi et al.

(10) Patent No.: US 9,148,738 B1
(45) Date of Patent: Sep. 29, 2015

(54) USING LOCAL GRADIENTS FOR PITCH RESISTANT AUDIO MATCHING

(75) Inventors: Matthew Sharifi, Zurich (CH); Dominik Roblek, Mountain View, CA (US)

(73) Assignee: Google Inc., Mountain View, CA (US)

( * ) Notice: Subject to any disclaimer, the term of this patent is extended or adjusted under 35 U.S.C. 154(b) by 825 days.

(21) Appl. No.: 13/435,700

(22) Filed: Mar. 30, 2012

(51) Int. Cl.
| | |
|---|---|
| *H04R 29/00* | (2006.01) |
| *G06F 17/00* | (2006.01) |
| *G10L 21/00* | (2013.01) |
| *G06F 17/27* | (2006.01) |
| *H04M 1/64* | (2006.01) |

(52) U.S. Cl.
CPC ............... *H04R 29/00* (2013.01); *G06F 17/00* (2013.01); *G06F 17/27* (2013.01); *G10L 21/00* (2013.01); *H04M 1/64* (2013.01)

(58) Field of Classification Search
CPC .............. G06F 17/28; G06F 17/30743; G06F 17/30746; G06F 17/30749; G06F 3/0484; G06F 3/0481; G06F 3/0482; G06F 3/04842; G06F 3/0488; G06F 17/00; G06F 13/3033; G06F 13/30628; G06F 13/30743; G10L 15/02; G10L 15/14; G10L 17/00; G10L 11/00; G10L 21/04; G10L 21/00; G10L 15/00; G10L 15/22; G10L 15/08; G10L 15/1822; G10L 15/25; G10L 15/26; G10L 15/265; G10L 25/48; G10L 2015/025; G10L 13/043; G10L 25/18; H03G 3/00; H04R 29/00; H04R 3/04; H04R 2227/005; H04R 7/045; H04L 12/1813; H04M 3/568
USPC ................ 381/56, 58, 59, 98, 316, 320, 71.1, 381/71.4, 71.11, 71.12, 71.14, 73.1, 80, 381/101, 102, 103; 700/94; 704/9, 270, 704/E19.01, E19.013, E19.024, E19.025, 704/E21.011; 379/88.01, 88.02, 379/88.04–88.08, 88.16, 88.18
See application file for complete search history.

(56) References Cited

U.S. PATENT DOCUMENTS

| | | | |
|---|---|---|---|
| 6,453,252 | B1 | 9/2002 | Laroche |
| 6,721,488 | B1 | 4/2004 | Dimitrova et al. |
| 7,516,074 | B2 | 4/2009 | Bilobrov |
| 7,809,580 | B2 | 10/2010 | Hotho et al. |
| 2002/0023020 | A1 | 2/2002 | Kenyon et al. |
| 2003/0086341 | A1* | 5/2003 | Wells et al. ............ 369/13.56 |

(Continued)

OTHER PUBLICATIONS

MusicBrainz—The Open Music Encyclopedia, http://musicbrainz.org, Last accessed Apr. 12, 2012.

(Continued)

*Primary Examiner* — Leshui Zhang
(74) *Attorney, Agent, or Firm* — Amin, Turocy & Watson, LLP

(57) ABSTRACT

System and methods for characterizing interest points within a descriptor are disclosed herein. The systems include generating a set of interest points related to an audio sample. A set of gradients relating to respective interest points in the set of interest points can be generated. A set of descriptors can then be generated based upon the set of interest points and the set of gradients and used in comparison to reference descriptors to identify the audio sample. The disclosed systems and methods provide for an audio matching system robust to pitch-shift distortion by using gradients that characterize the time-frequency neighborhood around an interest point rather than solely relying on interest points themselves. Thus, the disclosed system and methods result in more accurate audio identification.

26 Claims, 13 Drawing Sheets

(56) References Cited

U.S. PATENT DOCUMENTS

2009/0012638 A1   1/2009  Lou
2011/0173208 A1*  7/2011  Vogel .......................... 707/746

OTHER PUBLICATIONS

Shazam, http://www.shazam.com, Last accessed Apr. 19, 2012.

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed Jul. 11, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed Jul. 11, 2012.

\* cited by examiner

USING LOCAL GRADIENTS FOR PITCH RESISTANT AUDIO MATCHING

TECHNICAL FIELD

This application relates to audio matching, and more particularly to using local gradients of interest points of an audio sample in audio matching.

BACKGROUND

Audio matching provides for identification of a recorded audio sample by comparing the audio sample to a set of reference samples. To make the comparison, an audio sample can be transformed to a time-frequency representation of the sample by using, for example, a short time Fourier transform (STFT). Using the time-frequency representation, interest points that uniquely characterize time and frequency locations of peaks or other distinct patterns of the spectrogram can then be extracted from the audio sample. Descriptors can be computed as functions of sets of interest points. Descriptors of the audio sample can then be compared to descriptors of reference samples to determine identity of the audio sample.

In a typical descriptor audio matching system, interest points uniquely characterize an audio signal; thus, there is likely little overlap between interest points of two different segments of the audio sample. Pitch-shifting can affect an audio sample by shifting the frequency of interest points. For example, when trying to match audio played on the radio, television, or in a remix of a song, the speed of the audio sample may be slightly changed from the original. Samples that have altered speed will also likely have an altered pitch. Even a small pitch shift that is hard to notice for listeners may present difficult challenges in matching the pitch shifted signal due to interest points being altered from the pitch shift. Therefore, it is desirable to identify and use supplementary features of interest points that can be incorporated within a descriptor or supplemented to a descriptor in a manner that is robust to pitch shift distortion.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to audio matching. An input component can receive an audio sample. An input component can receive an audio signal excerpt. An interest point detection component can generate a set of interest points for the audio signal excerpt wherein respective interest points in the set of interest points are time-frequency points. A gradient component can generate a set of gradients for respective interest points in the set of interest points. A descriptor component can generate a set of descriptors for the audio signal excerpt based on the set of interest points and the set of gradients for respective interest point in the set of interest points.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
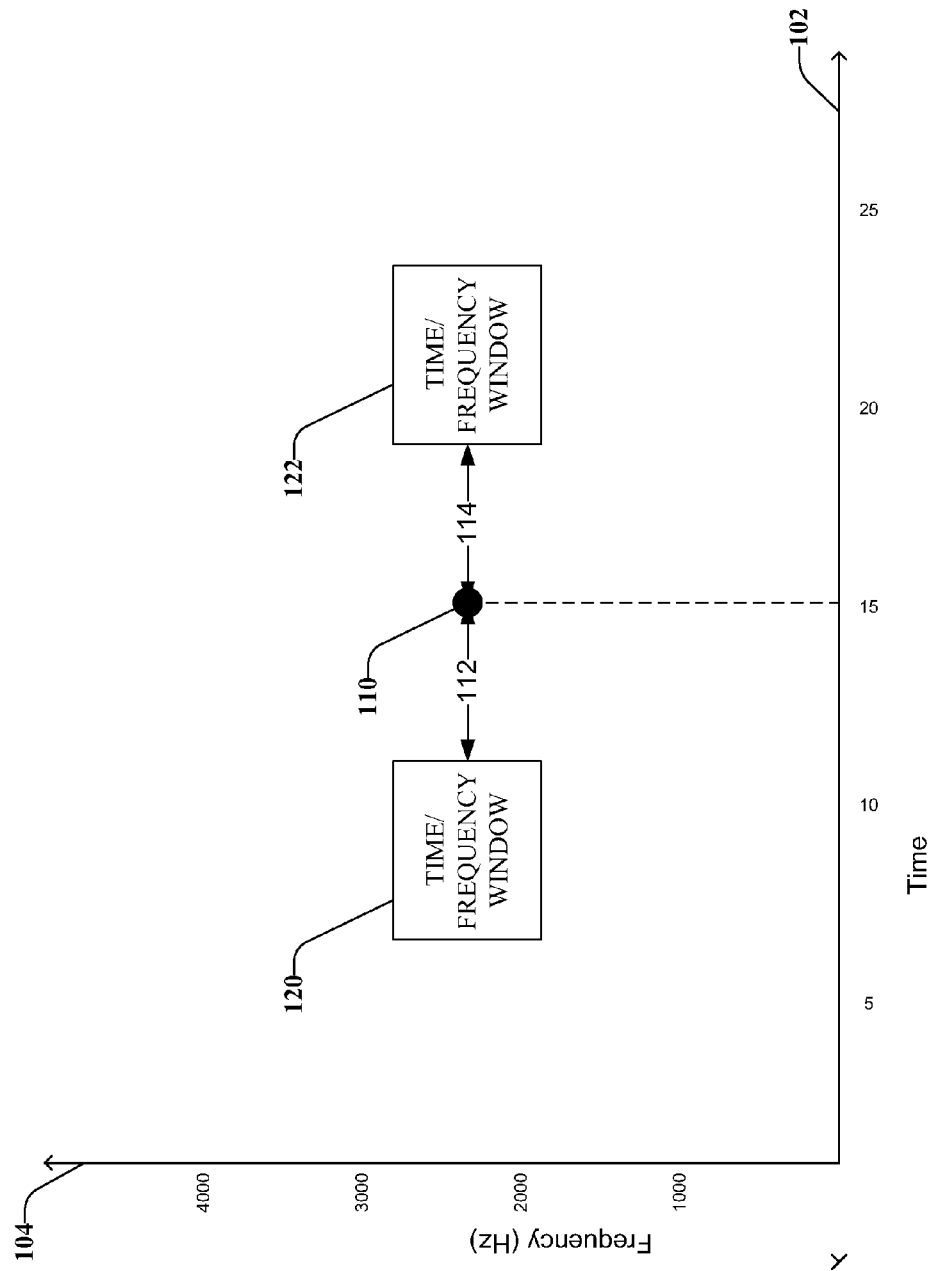
FIG. 1 illustrates an example time-frequency plot of an interest point and a horizontal gradient in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves analyzing an audio sample for unique characteristics that can be used in comparison to unique characteristics of reference samples to identify the audio sample. One manner to identify unique characteristics of an audio sample is through use of a spectrogram. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at a specific frequency and measure amplitude of the audio sample at that specific frequency over time. The audio sample can be run through additional filters to individually isolate a set of frequencies to measure the amplitude of the set over time. A spectrogram can be created by combining all the measurements over time on the frequency axis to generate a spectrogram image of frequency amplitudes over time.

A second technique involves using short-time Fourier transform ("STFT") to break down an audio sample into time windows, where each window is Fourier transformed to calculate a magnitude of the frequency spectrum for the duration of each window. Combining a plurality of windows side by side on the time axis of the spectrogram creates an image of frequency amplitudes over time. Other techniques, such as wavelet transforms, can also be used to construct a spectrogram.

Creating and storing in a database an entire spectrogram for a plurality of reference samples can require large amounts of storage space and affect scalability of an audio matching system. Therefore, it is desirable to instead calculate and store compact descriptors of reference samples versus an entire spectrogram. One method of calculating descriptors is to first determine individual interest points that identify unique characteristics of local features of the time-frequency representation of the reference sample. Descriptors can then be computed as functions of sets of interest points.

Calculating interest points involves identifying unique characteristics of the spectrogram. For example, an interest point could be a spectral peak of a specific frequency over a specific window of time. As another non-limiting example, an interest point could also include timing of the onset of a note. It is to be appreciated that conceivably any suitable spectral event over a specific duration of time could constitute an interest point.

For an audio sample experiencing pitch-shift distortion, the frequency of interest points can be distorted in that the measured frequency of an audio sample experiencing a pitch-shift at a specific point in time may vary from a clean reference sample of the same audio that is not experiencing distortion. As interest points within a fingerprint represent unique frequency events at specific moments in time, pitch-shifted interest points within a fingerprint may lead to a failure in identification of the audio sample.

While pitch-shifted frequencies can misrepresent the identify of an audio sample, supplementing interest points within a descriptor with additional features that are more resistant to pitch shift distortion can greatly improve the robustness of a system to pitch-shift distortion.

Systems and methods herein provide for generating gradients related to interest points within sets of descriptors. As discussed in greater detail below, various implementations provide for generating horizontal, vertical, or diagonal gradients that further characterize interest points within a descriptor. Gradients can be used to characterize the spectrogram neighborhood around interest points by expressing a ratio between an average energy in two regions of the spectrogram near an interest point. As pitch shift distortion generally scales linearly, the two regions used to generate the gradient likely both suffer from the same linearly applied pitch shift distortion. Thus, the gradient, computed as a ratio rather than an amount of energy, is far less likely to be affected by pitch shift distortion than an individual interest point characterized solely by its frequency at a moment in time. Characterizing energy ratios in the neighborhoods surrounding the interest point as gradients and incorporating the gradients into an audio matching system can improve accuracy in matching pitch shifted audio samples.

Referring to FIG. 1, there is illustrated an example time-frequency plot of an interest point and a horizontal gradient in accordance with implementations of this disclosure. Vertical axis 104 plots frequency, in this example in hertz (Hz). Horizontal axis 102 plots time. Interest point 110 corresponds to a spectral event at a specific frequency and at a specific point in time. The time for interest point 110 corresponds to 15 time units and the frequency corresponds to 2,250 Hz. It can be appreciated that interest point 110 can be one interest point among a set of hundreds or thousands of interest points, not shown in FIG. 1, that uniquely characterize an audio sample.

Because the horizontal axis plots time, the horizontal gradient is essentially a measurement of whether there is more energy in time-frequency window 120 (e.g., before the interest point) or more energy in time-frequency window 122 (e.g., after the interest point). In one implementation, time-frequency windows 120 and 122 can be a constant size, for example, for every interest point in a set of interest points for which horizontal gradients are generated. In one implementation, the width and height of time-frequency windows used to generate gradients can be based on the interest point frequency.

Gap region 112 can separate time-frequency window 120 from interest point 110. Similarly, gap region 114 can separate time-frequency window 122 from interest point 110. In one implementation, gap regions 112 and 114 are the same such that time-frequency window 120 and time-frequency window 122 are separated from interest point 110 by the same time frame. By including a gap region between interest point 110 and time-frequency windows 120 and 122 respectively, time-frequency windows 120 and 122 are less likely to contain spectral energy leaks from interest point 110 that could affect the calculation of the average energy within time-frequency windows 120 and 122.

The horizontal gradient can be computed, prior to any quantization, as a ratio: the average amount of energy in time-frequency window 120 divided by the average amount of energy in time-frequency window 122. In one implementation, the raw ratio can be used as a gradient and associated with interest points within a set of interest points. In another implementation, the ratio can be quantized, using, for example, binary quantization. Any ratio of less than one can be encoded as a zero and any ratio greater than or equal to one can be encoded as a one. Thus, the quantized horizontal gradient can be encoded as a zero when the average amount of energy in time-frequency window 120 is less than the average amount of energy in time-frequency window 122. The quantized horizontal gradient will be encoded as a one when the average amount of energy in time-frequency window 120 is greater than or equal to the average amount of energy in time-frequency window 122.

Figure 2:
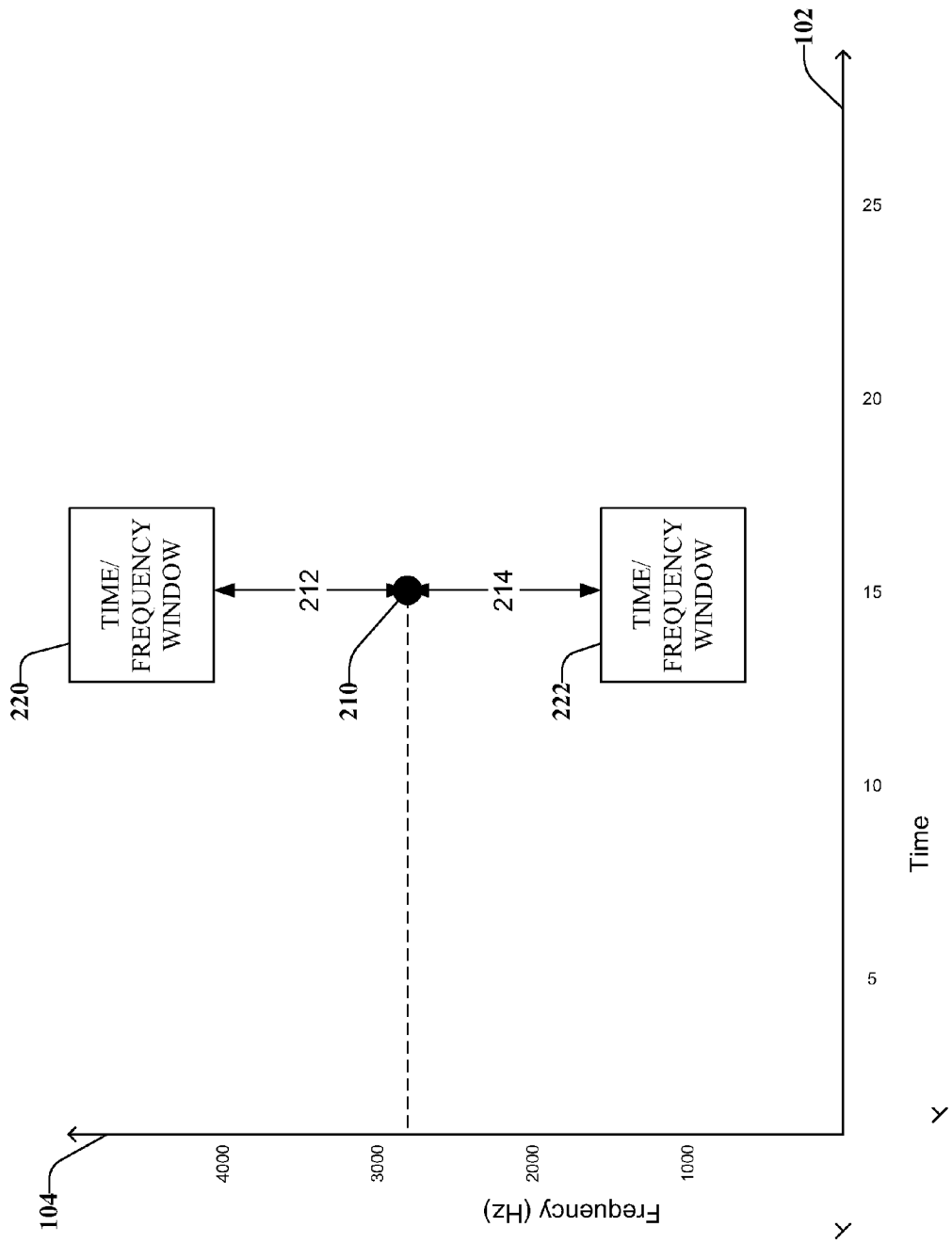
FIG. 2 illustrates an example time-frequency plot of an interest point and a vertical gradient in accordance with implementations of this disclosure.
Figure 3:
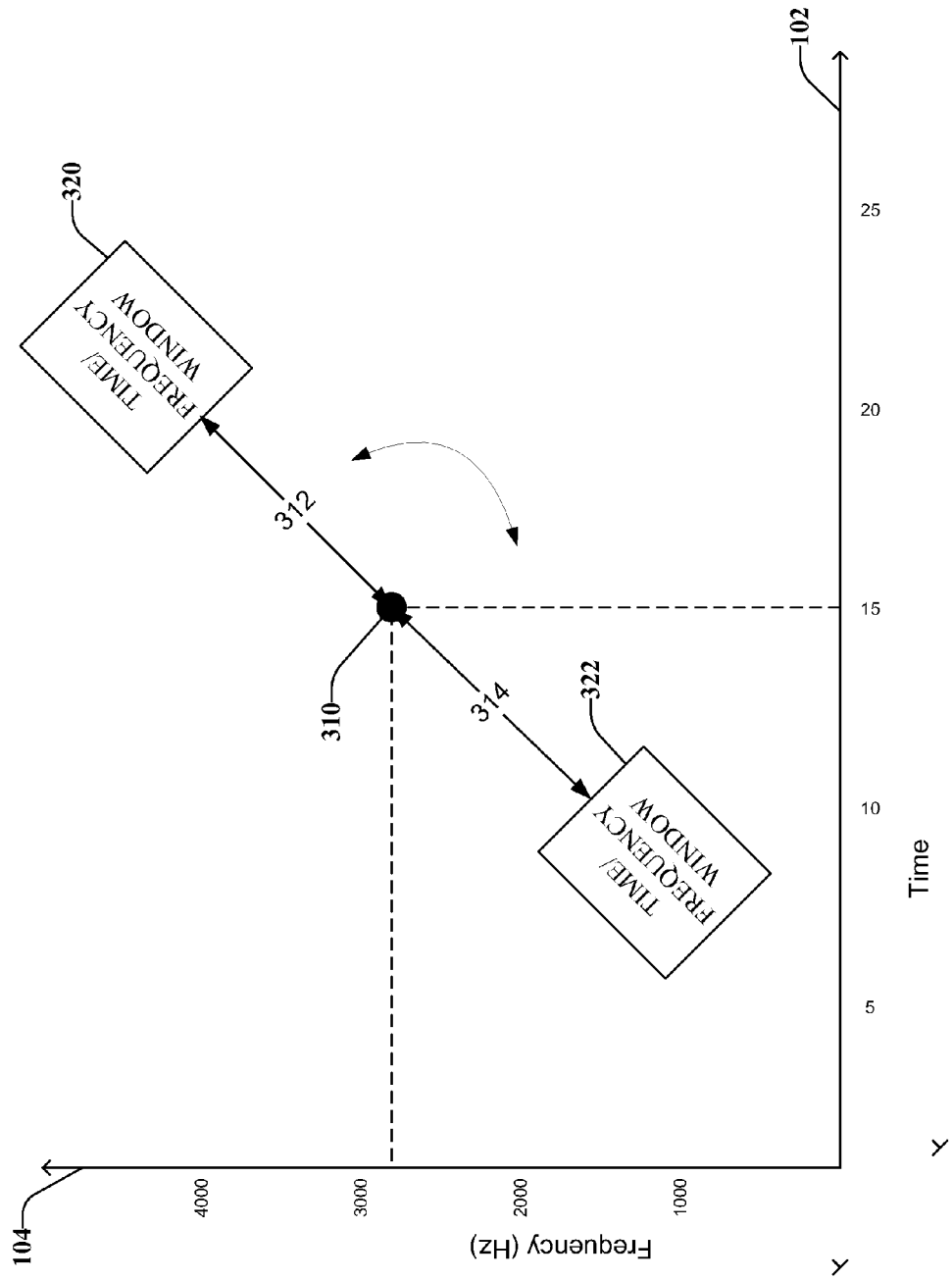
FIG. 3 illustrates an example time-frequency plot of an interest point and a diagonal gradient in accordance with implementations of this disclosure.

It can be appreciated that the horizontal gradient associated with interest point 110 can be supplemented with vertical gradients and diagonal gradients as more fully described with respect to FIG. 2 and FIG. 3. For example, a set of descriptors based on a set of gradients and corresponding interest points can include at least one of a horizontal gradient, a vertical gradient, or a diagonal gradient for respective interest points in the set of descriptors.

Referring to FIG. 2, there is illustrated an example time-frequency plot of an interest point and a vertical gradient in accordance with implementations of this disclosure. Interest point 210 corresponds to a spectral event at a specific frequency and at a specific point in time. The time for interest point 210 corresponds to 15 time units and the frequency corresponds to 2,800 Hz. It can be appreciated that interest point 210 can be one interest point among a set of hundreds or thousands of interest points, not shown in FIG. 2, that uniquely characterize an audio sample.

Because the vertical axis plots frequency, the vertical gradient is essentially a measurement of whether there is more energy in time-frequency window 220 (e.g., in frequencies above the interest point) or more energy in time-frequency window 222 (e.g., in frequencies below the interest point). In one implementation, time-frequency windows 220 and 222 can be a constant size, for example, for every interest point in a set of interest points for which vertical gradients are generated. In one implementation, the width and height of time-frequency windows used to generate gradients can be based on the interest point frequency.

Gap region 212 can separate time-frequency window 220 from interest point 210. Similarly, gap region 214 can separate time-frequency window 222 from interest point 210. In one implementation, gap regions 212 and 214 are the same such that time-frequency window 220 and time-frequency window 222 are separated from interest point 210 by the same frequency band. By including a gap region between interest point 210 and time-frequency windows 220 and 222 respectively, time-frequency windows 220 and 222 are less likely to contain spectral energy leaks from interest point 210 that could affect the calculation of the average energy within time-frequency windows 220 and 222.

The vertical gradient can be computed, prior to any quantization, as a ratio: the average amount of energy in time-frequency window 220 divided by the average amount of energy in time-frequency window 222. In one implementation, the raw ratio can be used as a gradient and associated with interest points within a set of interest points. In another implementation, the ratio can be quantized, using, for example, binary quantization. Any ratio of less than one can be encoded as a zero and any ratio greater than or equal to one can be encoded as a one. Thus, the quantized vertical gradient can be encoded as a zero when the average amount of energy in time-frequency window 220 is less than the average amount of energy in time-frequency window 222. The quantized vertical gradient will be encoded as a one when the average amount of energy in time-frequency window 220 is greater than or equal to the average amount of energy in time-frequency window 222.

It can be appreciated that the vertical gradient associated with interest point 210 can be supplemented with horizontal gradients and diagonal gradients as more fully described with respect to FIG. 1 and FIG. 3. For example, a set of descriptors based on a set of gradients and corresponding interest points can include at least one of a horizontal gradient, a vertical gradient, or a diagonal gradient for respective interest points in the set of descriptors.

Referring to FIG. 3, there is illustrated an example time-frequency plot of an interest point and a diagonal gradient in accordance with implementations of this disclosure. Interest point 310 corresponds to a spectral event at a specific frequency and at a specific point in time. The time for interest point 310 corresponds to 15 time units and the frequency corresponds to 2,800 Hz. It can be appreciated that interest point 310 can be one interest point among a set of hundreds or thousands of interest points, not shown in FIG. 3, that uniquely characterize an audio sample.

While horizontal gradients measured an average energy before and after an interest point and vertical gradients measured an average energy in a frequency range above and below the interest point, a diagonal gradient can measure whether there is more energy time-frequency window 320 separated from interest point 310 by gap vector 312 or in time-frequency window 322 separated from interest point 310 by gap vector 314 which is an inverse vector to gap vector 312. Thus, gap vector 312 is not limited in pointing to a time-frequency window that is greater in both time and frequency than interest point 312, as depicted in FIG. 3, but could instead point to, for example, a time-frequency window that is lesser in both time and frequency than interest point 312. As gap vector 314 is the inverse vector to gap vector 312, time-frequency windows 320 and 322 will not overlap and will instead be separated by twice the distance of gap vector 312 or 314. By including a gap region between interest point 310 and time-frequency windows 320 and 322 respectively, time-frequency windows 320 and 322 are less likely to contain spectral energy leaks from interest point 310 that could affect the calculation of the average energy within time-frequency windows 320 and 322.

In one implementation, time-frequency windows 320 and 322 can be a constant size, for example, for every interest point in a set of interest points for which vertical gradients are generated. In one implementation, the width and height of time-frequency windows used to generate gradients can be based on the interest point frequency.

The diagonal gradient can be computed, prior to any quantization, as a ratio: the average amount of energy in time-frequency window 320 divided by the average amount of energy in time-frequency window 322. In one implementation, the raw ratio can be used as a gradient and associated with interest points within a set of interest points. In another implementation, the ratio can be quantized, using, for example, binary quantization. Any ratio of less than one can be encoded as a zero and any ratio greater than or equal to one can be encoded as a one. Thus, the quantized diagonal gradient can be encoded as a zero when the average amount of energy in time-frequency window 320 is less than the average amount of energy in time-frequency window 322. The quantized diagonal gradient can be encoded as a one when the average amount of energy in time-frequency window 320 is greater than or equal to the average amount of energy in time-frequency window 322.

It can be appreciated that the diagonal gradient associated with interest point 310 can be supplemented with horizontal gradients and vertical gradients as more fully described with respect to FIG. 1 and FIG. 2. For example, a set of descriptors based on a set of gradients and corresponding interest points can include at least one of a horizontal gradient, a vertical gradient, or a diagonal gradient for respective interest points in the set of descriptors.

Figure 4:
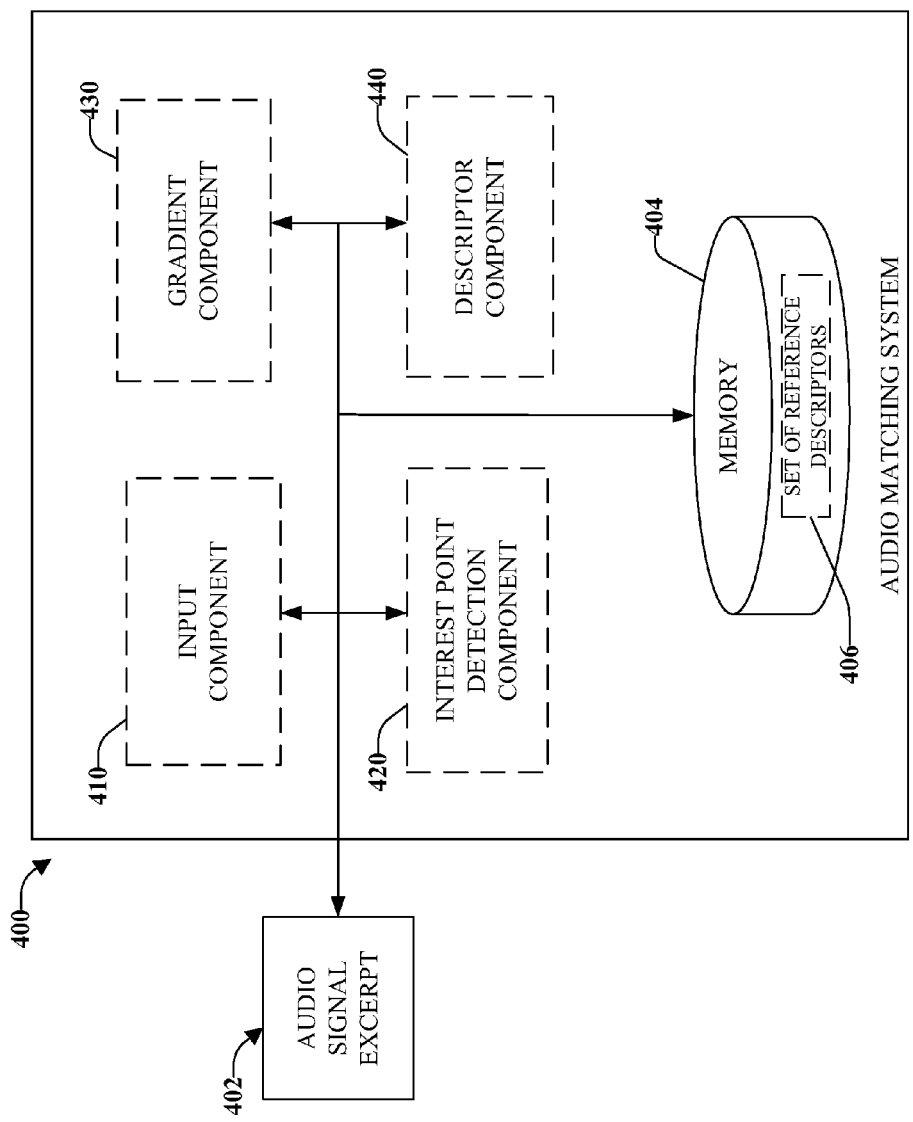
FIG. 4 illustrates a high-level functional block diagram of an example audio matching system using gradients in accordance with implementations of this disclosure.

Referring now to FIG. 4, there is illustrated a high-level functional block diagram of an example audio matching system using gradients in accordance with implementations of this disclosure.

An input component 410 can receive an audio signal excerpt 402 and generate a spectrogram of the audio signal excerpt. It can be appreciated that audio signal excerpt 402 can be a partial recording or a full recording. It can be further appreciated that audio signal excerpt 402 is not required to be a specific type of audio file or recording, and could be, for example, an AAC, FLAG, Vorbis, WMA, etc.

An interest point detection component 420 can generate a set of interest points for audio signal excerpt 402, based at least in part on the spectrogram, wherein respective interest points in the set of interest points are time, frequency points. It can be appreciated that interest point detection component 420 can generate interest points using any known interest point detection method that generates unique time-frequency spectral events.

A gradient component 430 can generate a set of gradients for respective interest points in the set of interest points, based at least in part on the spectrogram. In one implementation, the set of gradients for respective interest points in the set of interest points can include a horizontal gradient. The horizontal gradient can be an energy ratio based on a mean amount of energy in a time window prior to the interest point and a mean amount of energy in a time window after the interest point. The time window prior to the interest point and the time window after the interest point can be separated by a time gap.

In one implementation, the set of gradients for respective interest points in the set of interest points can include a vertical gradient. The vertical gradient can be an energy ratio based on a mean amount of energy in a frequency window lower than the interest point and a mean amount of energy in a frequency window higher than the interest point. The frequency window lower than the interest point and the frequency window higher than the interest point can be separated by a frequency gap.

In one implementation, the set of gradients for respective interest points in the set of interest points can include a diagonal gradient. The diagonal gradient can be an energy ratio based on a mean amount of energy in a time-frequency window separated from an interest point by a vector gap and a mean amount of energy in a time-frequency window separated from an interest point by an inverse vector gap.

A descriptor component 440 can generate a set of descriptors for the audio signal excerpt based on the set of interest points and the set of gradients for respective interest point in the set of interest points. For example, multiple descriptors can be generated for audio signal excerpt 402, where each descriptor contains a subset of the interest points generated by interest point detection component 420. In one implementation, time and frequency location of interest points and/or the magnitude of interest points can be added to a descriptor along with gradient information including multiple gradients in some implementations, wherein the gradients are associated with the interest point they relate to.

Figure 5:
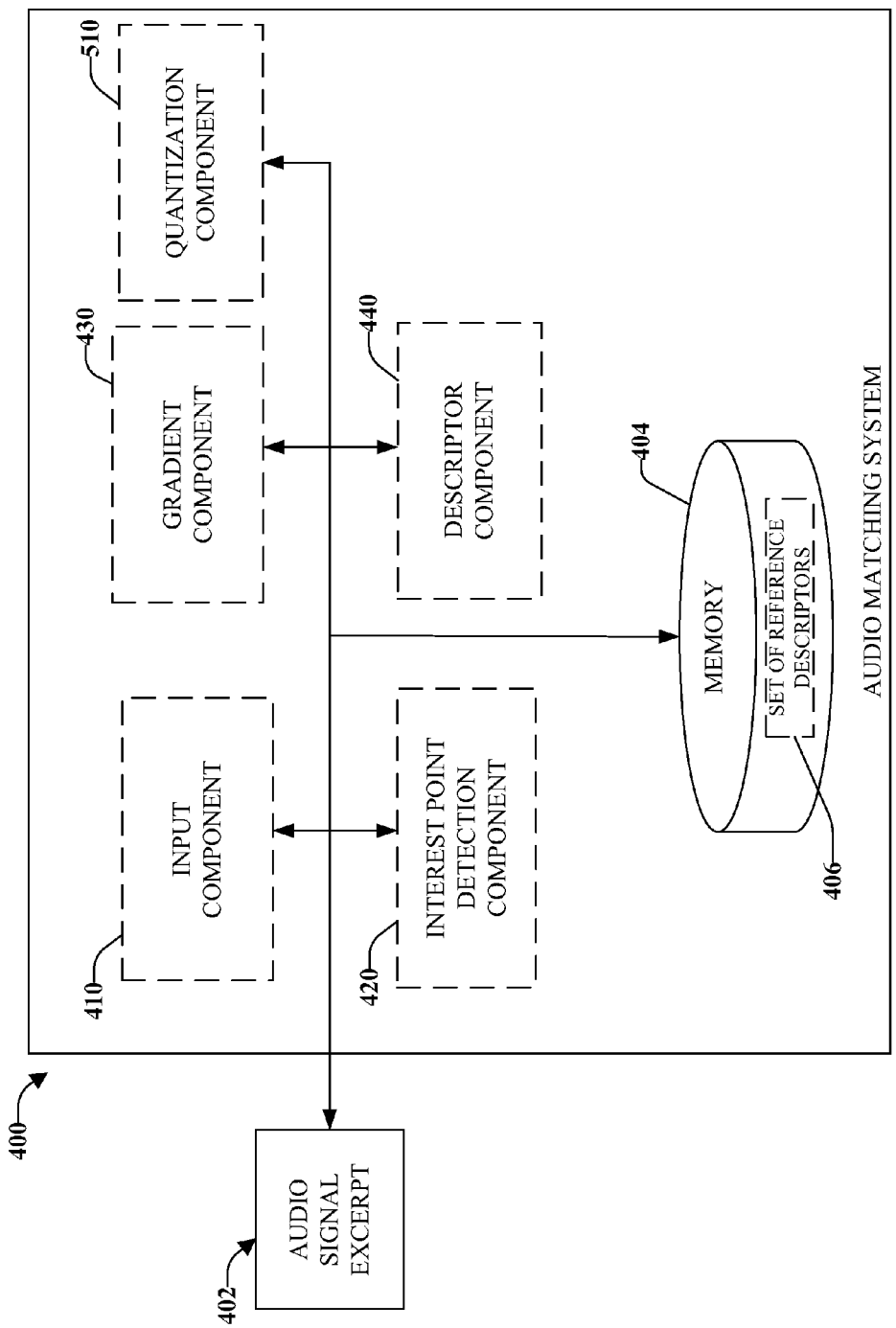
FIG. 5 illustrates a high-level functional block diagram of an example audio matching system using gradients including a quantization component in accordance with implementations of this disclosure.

Referring now to FIG. 5, there is illustrated a high-level functional block diagram of an example audio matching system using gradients including a quantization component 510 in accordance with implementations of this disclosure. Quantization component 510 can generate a quantized set of gradients for respective interest point in the set of interest points. For example, gradients can be quantized for use in locality-sensitive hashing (LSH). In one implementation, binary quantization can be used where ratios less than one are encoded as zero and ratios greater than or equal to one are encoded as one. In another implementation, additional bins can be used for quantization rather than a single bit.

Figure 6:
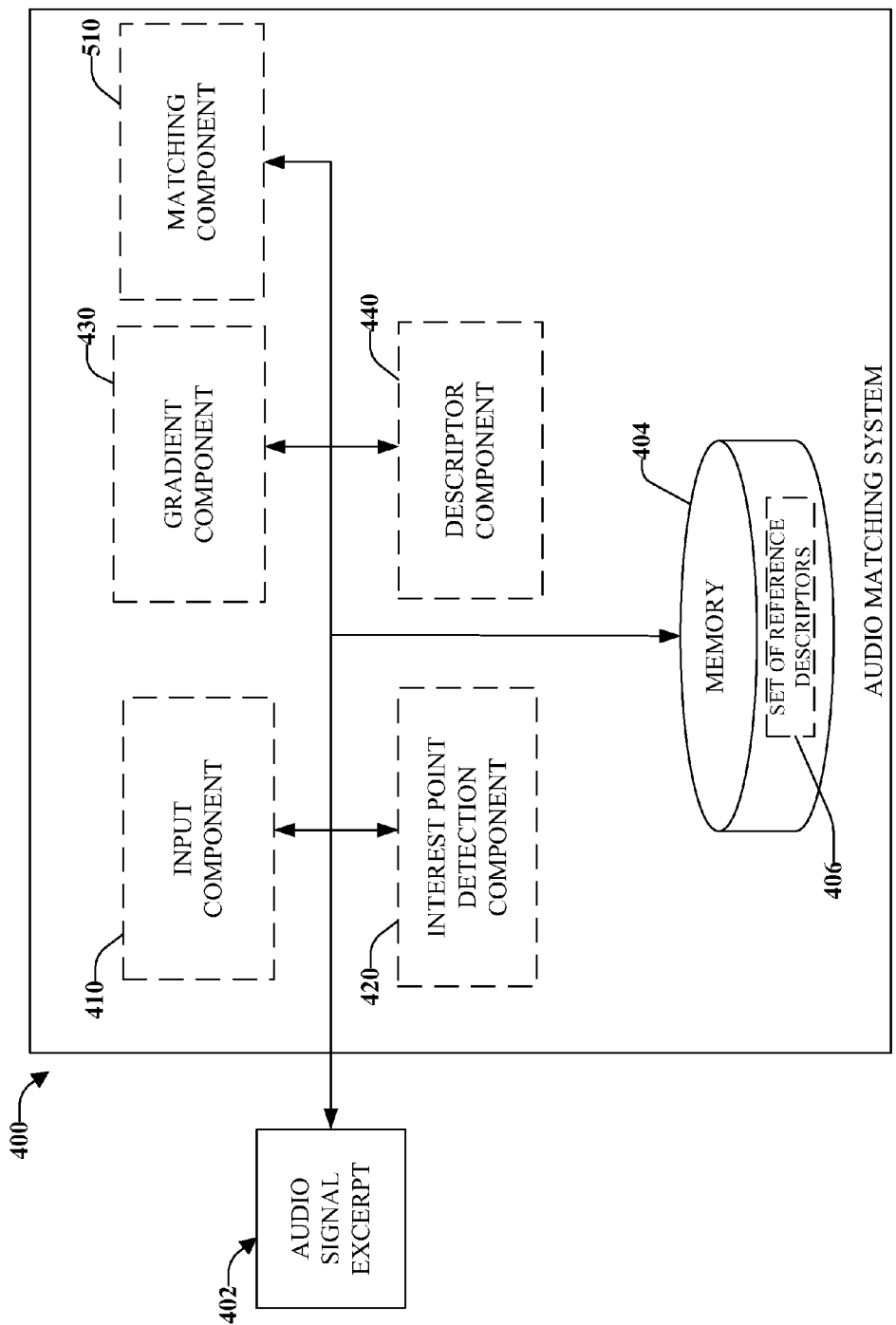
FIG. 6 illustrates a high-level functional block diagram of an example audio matching system using gradients including a matching component in accordance with implementations of this disclosure.

Referring now to FIG. 6, there is illustrated a high-level functional block diagram of an example audio matching system using gradients including a matching component 610 in accordance with implementations of this disclosure. Matching component 610 can identify audio signal excerpt 402 by comparing the set of descriptors to a set of reference descriptors 406. It can be appreciated that the set of reference descriptors 406 can include gradient information within the respective descriptors.

Figure 7:
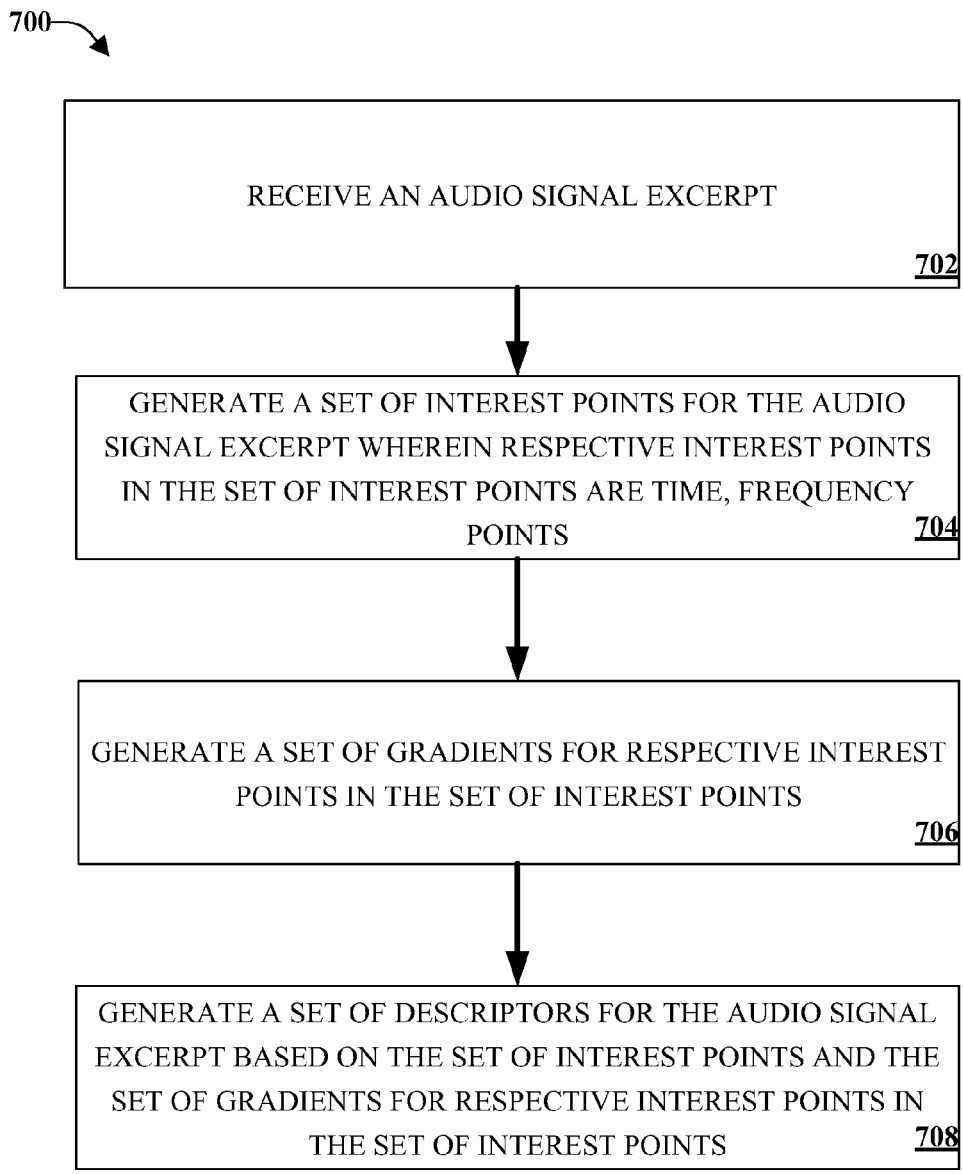
FIG. 7 illustrates an example method for generating gradients and descriptors in accordance with implementations of this disclosure.
Figure 8:
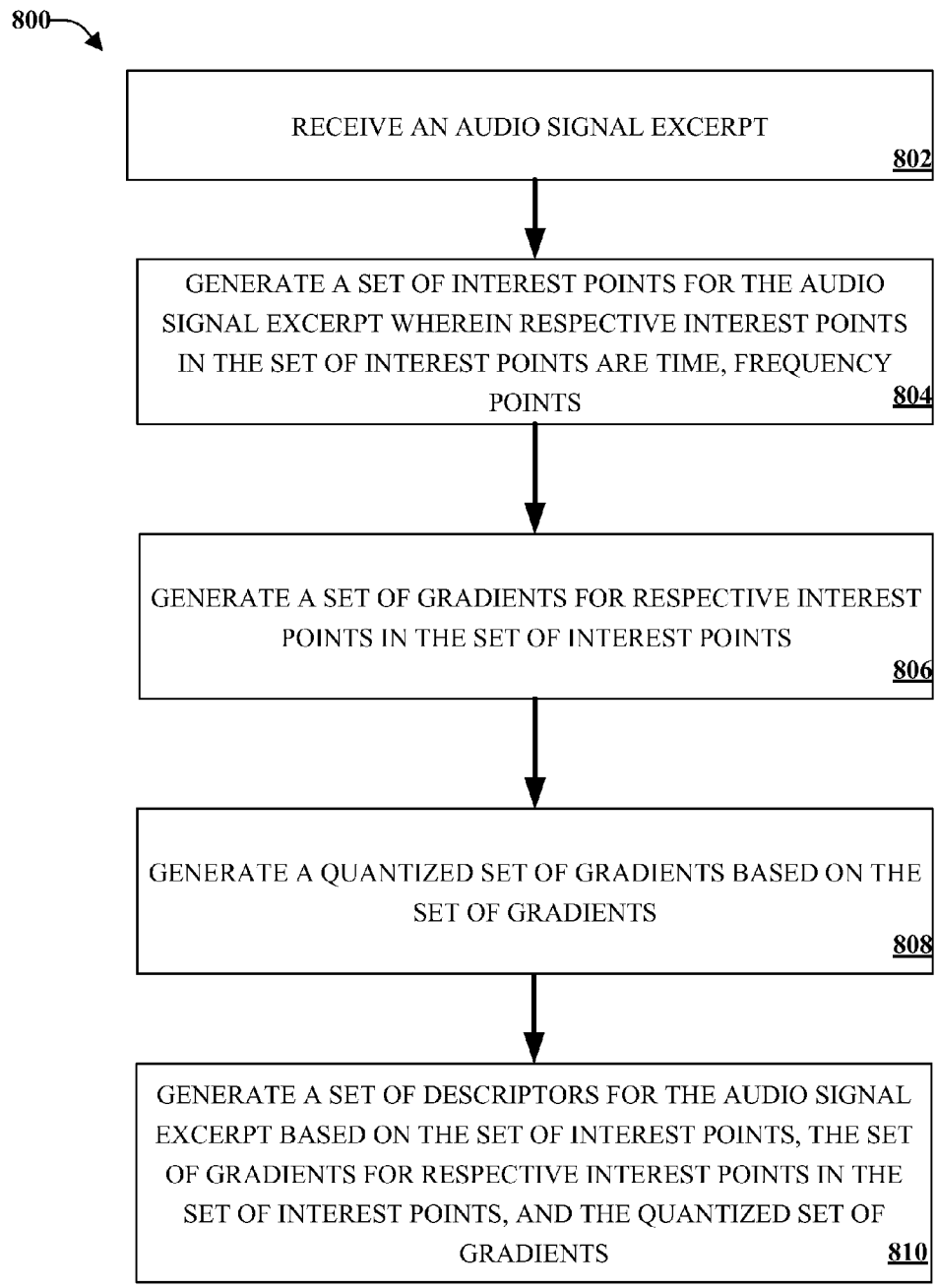
FIG. 8 illustrates an example method for generating quantized gradients and descriptors in accordance with implementations of this disclosure.

FIGS. 7-8 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methods.

FIG. 7 illustrates an example method for generating gradients and descriptors in accordance with implementations of this disclosure. At 702, an audio signal excerpt can be received (e.g., by an input component) and a spectrogram can be generated. At 704, a set of interest points for the audio signal excerpt can be generated (e.g., by an interest point detection component) based at least in part on the spectrogram wherein respective interest points in the set of interest points are time-frequency points. At 706, a set of gradients can be generated (e.g., by a gradient component) for respective interest points in the set of interest points. At 708, a set of descriptors for the audio signal excerpt can be generated (e.g., by a descriptor component) based on the set of interest points and the set of gradients for respective interest points in the set of interest points.

FIG. 8 illustrates an example method for generating quantized gradients and descriptors in accordance with implementations of this disclosure. At 802, an audio signal excerpt can be received (e.g., by an input component) and a spectrogram can be generated. At 804, a set of interest points for the audio signal excerpt can be generated (e.g., by an interest point detection component) based at least in part on the spectrogram wherein respective interest points in the set of interest points are time-frequency points. At 806, a set of gradients can be generated (e.g., by a gradient component) for respective interest points in the set of interest points. At 808, a quantized set of gradients can be generated (e.g., by a quantization component) based on the set of gradients. At 810, a set of descriptors for the audio signal excerpt can be generated (e.g., by a descriptor component) based on the set of interest points, the set of gradients for respective interest points in the set of interest points, and the quantized set of gradients.

Figure 9:
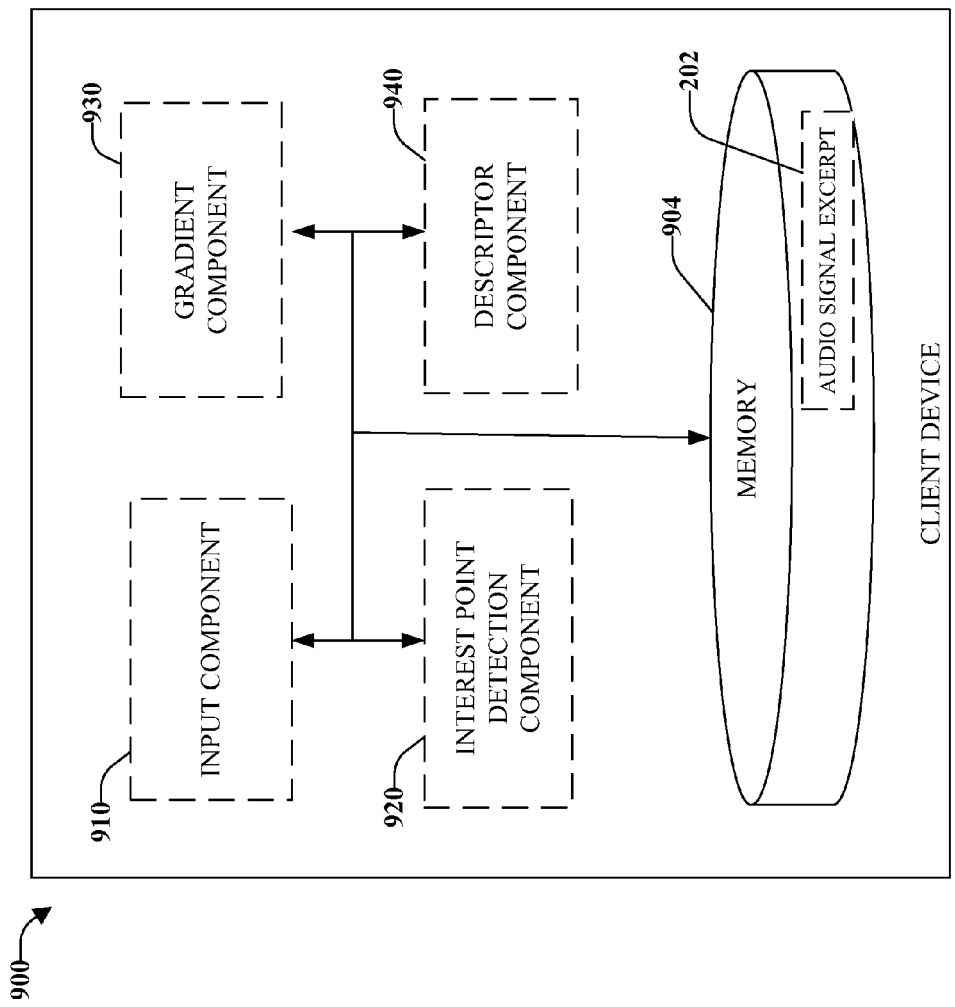
FIG. 9 illustrates a high-level functional block diagram of an example client device generating gradients for use in audio matching in accordance with implementations of this disclosure.

FIG. 9 illustrates a high-level functional block diagram of an example client device generating gradients for use in audio matching in accordance with implementations of this disclosure. A client device could include a smart phone, a tablet, an e-reader, a personal digital assistant, a desktop computer, a laptop computer, a server, etc. An input component 910 can receive an audio signal excerpt 202 and generate a spectrogram of audio signal excerpt 202. Audio signal excerpt 202 can be an audio file stored within memory 904. An interest point detection component 920 can generate a set of interest points for the audio signal excerpt wherein respective interest points in the set of interest points are time, frequency points. A gradient component 930 can generate a set of gradients for respective interest point in the set of interest points. A descriptor component 940 can generate a set of descriptors for the audio signal excerpt based on the set of interest points and the set of gradients for respective interest point in the set of interest points.

Figure 10:
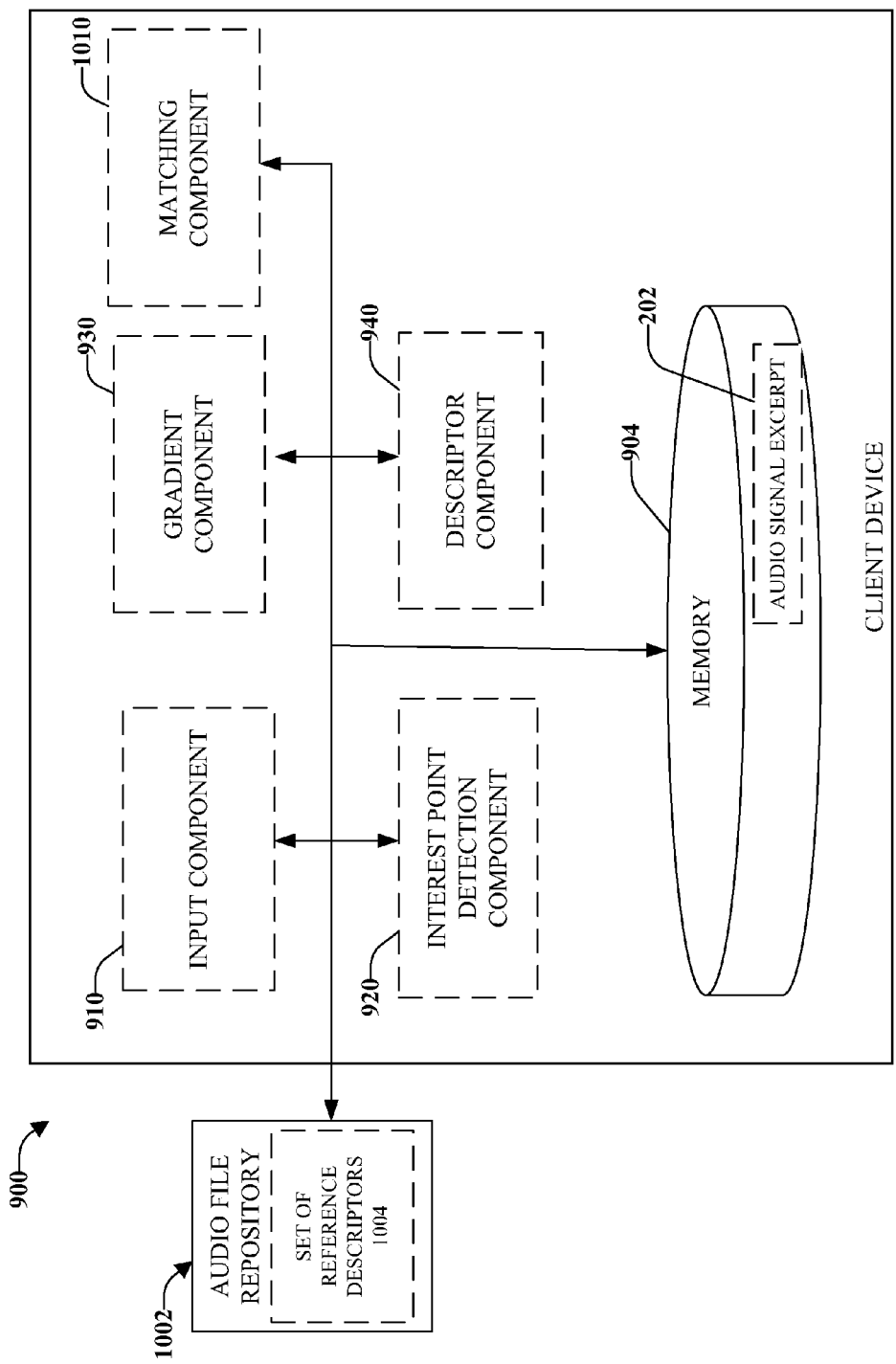
FIG. 10 illustrates a high-level functional block diagram of an example client device generating gradients for use in audio matching including a matching component in accordance with implementations of this disclosure.

FIG. 10 illustrates a high-level functional block diagram of an example client device generating gradients for use in audio matching including a matching component 1010 in accordance with implementations of this disclosure. Matching component 1010 can employ a set of reference descriptors 1004 to identify a potential match of the audio signal excerpt and an audio file stored in a repository 1002. It can be appreciated that the set of descriptors 1004 can include gradient information within the respective descriptors.

Figure 11:
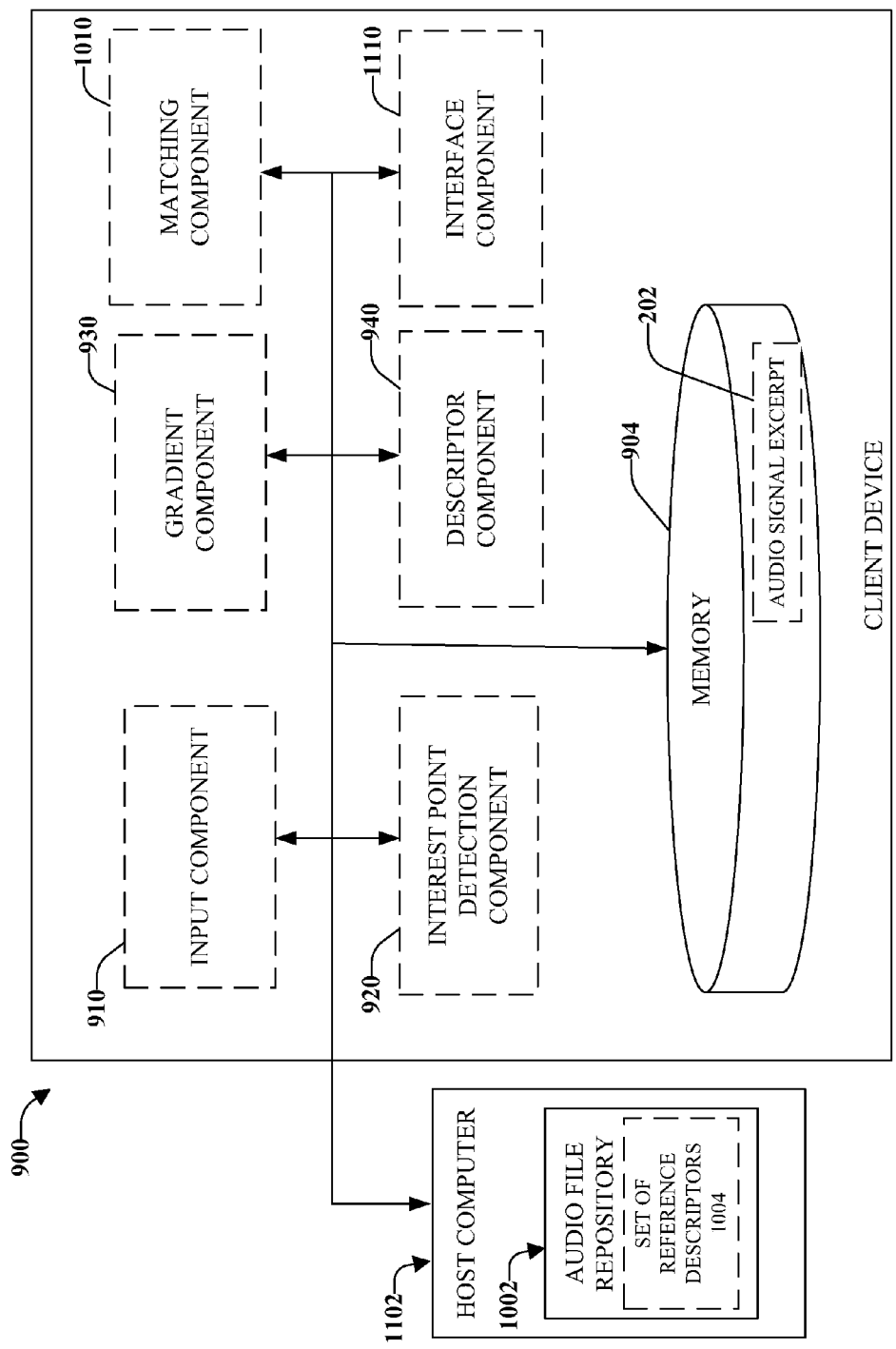
FIG. 11 illustrates a high-level functional block diagram of an example client device generating gradients for use in audio matching including an interface component in accordance with implementations of this disclosure.

FIG. 11 illustrates a high-level functional block diagram of an example client device generating gradients for use in audio matching including an interface component 1110 in accordance with implementations of this disclosure. Interface component 1110 can communicatively couple matching component 1010 to the repository of stored audio files 1002, wherein the repository is located at a host computer 1102. In one implementation, matching component 1010 can perform the match by transmitting the set of descriptors to host computer 1202, wherein the host computer 1202 employs the set of reference descriptors 1004 to identify a potential match.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 12:
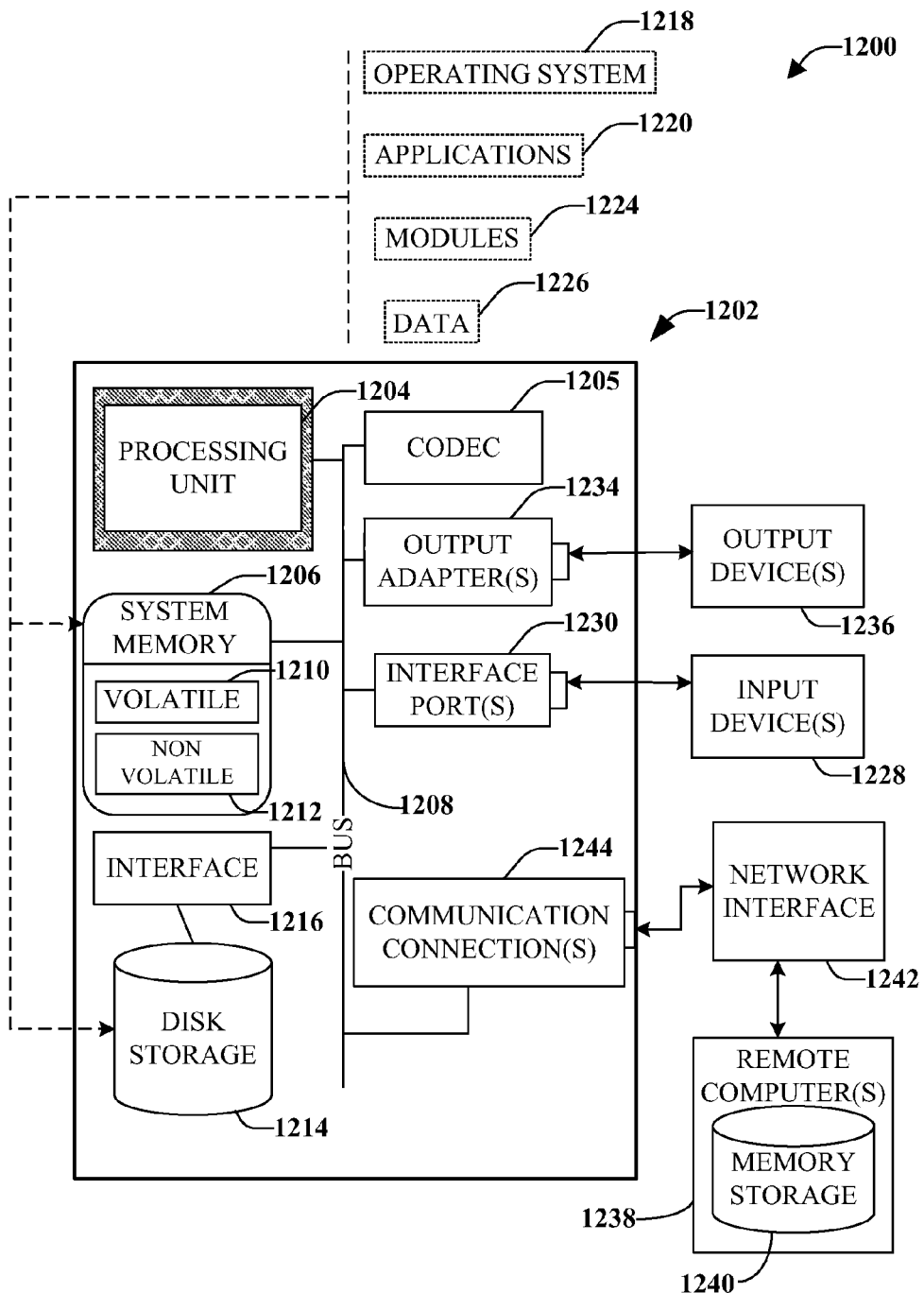
FIG. 12 illustrates an example block diagram of a computer operable to execute the disclosed architecture in accordance with implementations of this disclosure.

With reference to FIG. 12, a suitable environment 1200 for implementing various aspects of the claimed subject matter includes a computer 1202. The computer 1202 includes a processing unit 1204, a system memory 1206, a codec 1205, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1206 includes volatile memory 1210 and non-volatile memory 1212. The basic input/output system (BIOS), containing the basic routines to transfer information between elements within the computer 1202, such as during start-up, is stored in non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), or flash memory. Volatile memory 1210 includes random access memory (RAM), which acts as external cache memory. According to present aspects, the volatile memory may store the write operation retry logic (not shown in FIG. 12) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 1202 may also include removable/non-removable, volatile/non-volatile computer storage media. FIG. 12 illustrates, for example, a disk storage 1214. Disk storage 1214 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1214 to the system bus 1208, a removable or non-removable interface is typically used, such as interface 1216.

It is to be appreciated that FIG. 12 describes software that acts as an intermediary between users and the basic computer resources described in the suitable operating environment 1200. Such software includes an operating system 1218. Operating system 1218, which can be stored on disk storage 1214, acts to control and allocate resources of the computer system 1202. Applications 1220 take advantage of the management of resources by operating system 1218 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s) 1228. Thus, for example, a USB port may be used to provide input to computer 1202, and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

Figure 13:
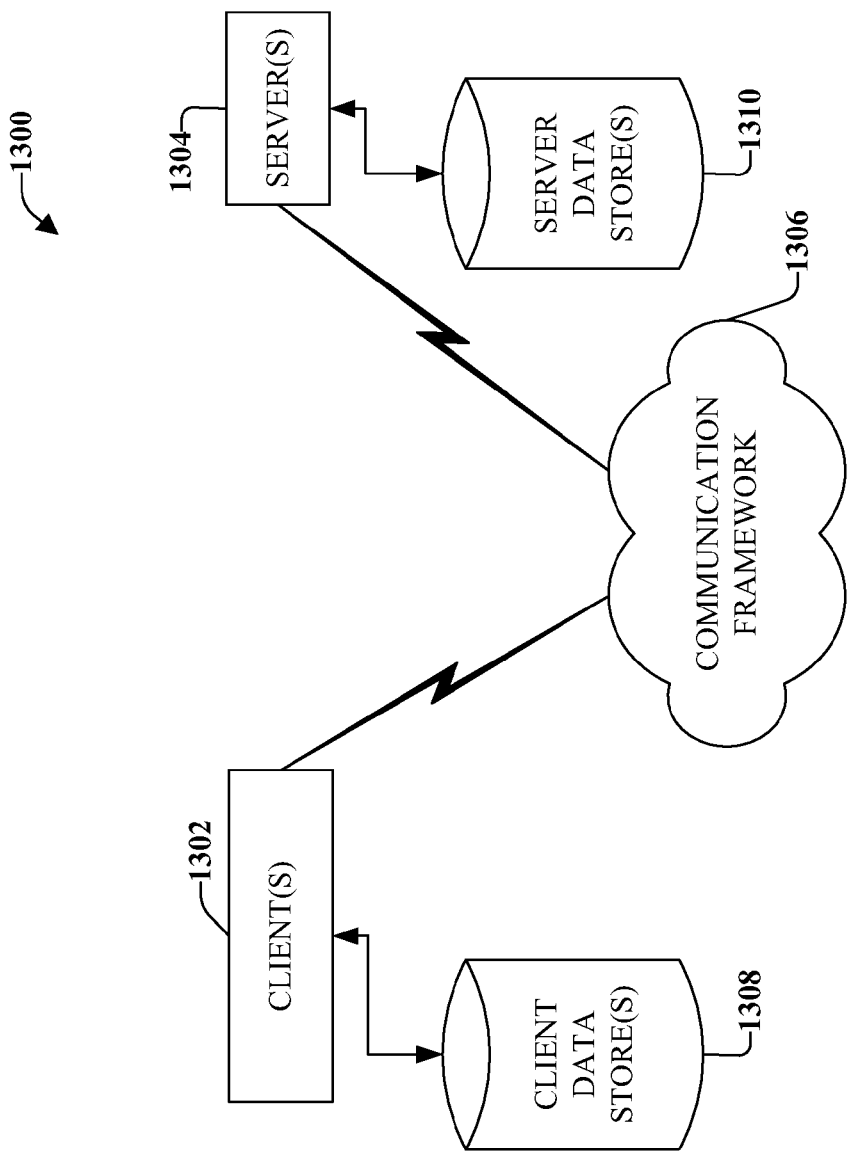
FIG. 13 illustrates an example schematic block diagram for a computing environment in accordance with implementations of this disclosure.

Referring now to FIG. 13, there is illustrated a schematic block diagram of a computing environment 1300 in accordance with the subject specification. The system 1300 includes one or more client(s) 1302, which can include an application or a system that accesses a service on the server 1304. The client(s) 1302 can be hardware and/or software (e.g., threads, processes, computing devices). The client(s) 1302 can house cookie(s), metadata, and/or associated contextual information by employing the specification, for example.

The system 1300 also includes one or more server(s) 1304. The server(s) 1304 can also be hardware or hardware in combination with software (e.g., threads, processes, computing devices). The servers 1304 can house threads to perform, for example, receiving an audio sample, generating a spectrogram, generating interest points, identifying peaks of a spectrogram, generating gradients, generating descriptors, matching descriptors, etc. in accordance with the subject disclosure. One possible communication between a client 1302 and a server 1304 can be in the form of a data packet adapted to be transmitted between two or more computer processes where the data packet contains, for example, an audio sample or descriptors associated with an audio sample. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system, comprising:
   a memory that stores computer executable components; and
   a processor that executes the following computer executable components stored within the memory;
      an input component that receives an audio signal excerpt and generates a spectrogram of the audio signal excerpt;
      an interest point detection component that generates a set of interest points for the audio signal excerpt based at least in part on the spectrogram, wherein interest points in the set of interest points are time-frequency points;
      a gradient component that generates respective gradients for interest points in the set of interest points based at least in part on the spectrogram, where each gradient comprises a ratio of a mean amount of energy in a window of the spectrogram prior to an interest point associated with the gradient as compared to a mean amount of energy in a window of the spectrogram after the interest point associated with the gradient, and each window comprises a plurality of time-frequency points;
      a descriptor component that generates a set of descriptors for the audio signal excerpt based on the set of interest points and the respective gradients for the interest points in the set of interest points.

2. The system of claim 1, wherein the gradients include a horizontal gradient.

3. The system of claim 2, wherein the ratio is based on a mean amount of energy in a time-frequency window prior to the interest point on a time axis as compared to a mean amount of energy in a time-frequency window after the interest point on the time axis.

4. The system of claim 3, wherein the time-frequency window prior to the interest point and the time-frequency window after the interest point are separated by respective time gaps from the interest point.

5. The system of claim 1, wherein the gradients include a vertical gradient.

6. The system of claim 5, wherein the ratio is based on a mean amount of energy in a time-frequency window lower on a frequency axis than the interest point as compared to a mean amount of energy in a time-frequency window higher on the frequency axis than the interest point.

7. The system of claim 6, wherein the time-frequency window lower than the interest point and the time-frequency window higher than the interest point are separated by respective frequency gaps from the interest point.

8. The system of claim 1, wherein the gradients includes a diagonal gradient.

9. The system of claim 8, wherein the ratio is based on a mean amount of energy in a time-frequency window separated from the interest point by a vector gap along a time axis and a frequency axis as compared to a mean amount of energy in a time-frequency window separated from the interest point by an inverse vector gap along the time axis and the frequency axis.

10. The system of claim 9, wherein the inverse vector gap is inversely related to the vector gap.

11. The system of claim 1, further comprising:
    a quantization component that quantizes the gradients.

12. The system of claim 11, wherein the descriptor component generates the descriptor further based on the quantized gradients.

13. The system of claim 1, further comprising:
    a matching component that identifies the audio signal excerpt by comparing the set of descriptors to a set of reference descriptors.

14. A method, comprising:
    receiving, by a system including a processor, an audio signal excerpt;
    generating, by the system, a spectrogram of the audio signal excerpt;
    generating, by the system, a set of interest points for the audio signal excerpt based at least in part on the spectrogram, wherein interest points in the set of interest points are time-frequency points;
    generating, by the system, respective gradients for interest points in the set of interest points based at least in part on the spectrogram, where each gradient comprises a ratio of a mean amount of energy in a window of the spectrogram prior to an interest point associated with the gradient as compared to a mean amount of energy in a window of the spectrogram after the interest point associated with the gradient, and each window comprises a plurality of time-frequency points;
    generating, by the system, a set of descriptors for the audio signal excerpt based on the set of interest points and the respective gradients for the interest points in the set of interest points.

15. The method of claim 14, wherein the gradients include a horizontal gradient.

16. The method of claim 15, wherein the ratio is based on a mean amount of energy in a time-frequency window prior to the interest point on a time axis as compared to a mean amount of energy in a time-frequency window after the interest point on the time axis.

17. The method of claim 16, wherein the time-frequency window prior to the interest point and the time window after the interest point are separated by respective time gaps from the interest point.

18. The method of claim 14, wherein the gradients include a vertical gradient.

19. The method of claim 18, wherein the ratio is based on a mean amount of energy in a time-frequency window lower on a frequency axis than the interest point as compared to a mean amount of energy in a time-frequency window higher on the frequency axis than the interest point.

20. The method of claim 19, wherein the time-frequency window lower than the interest point and the time-frequency window higher than the interest point are separated by respective frequency gaps from the interest point.

21. The method of claim 14, wherein the gradients include a diagonal gradient.

22. The method of claim 21, wherein the ratio is based on a mean amount of energy in a time-frequency window separated from the interest point by a vector gap along a time axis and a frequency axis as compared to a mean amount of energy in a time-frequency window separated from the interest point by an inverse vector gap along the time axis and the frequency axis.

23. The method of claim 14, further comprising:
quantizing the gradients, and wherein the generating the set of descriptors for the audio signal excerpt is further based on the quantized gradients.

24. A non-transitory computer-readable medium having instructions stored thereon that, in response to execution, cause a system including a processor to perform operations comprising:
receiving an audio signal excerpt;
generating a spectrogram of the audio signal excerpt;
generating a set of interest points for the audio signal excerpt based at least in part on the spectrogram, wherein interest points in the set of interest points are time-frequency points;
generating respective gradients for interest points in the set of interest points based at least in part on the spectrogram, where each gradient comprises a ratio of a mean amount of energy in a window of the spectrogram prior to an interest point associated with the gradient as compared to a mean amount of energy in a window of the spectrogram after the interest point associated with the gradient, and each window comprises a plurality of time-frequency points;
generating a set of descriptors for the audio signal excerpt based on the set of interest points and the respective gradients for the interest points in the set of interest points.

25. The non-transitory computer-readable medium of claim 24, the operations further comprising employing the set of descriptors to identify a potential match of the audio signal excerpt and an audio file stored in a repository.

26. The non-transitory computer-readable medium of claim 24, wherein the gradients include at least one of a horizontal gradient, a vertical gradient, or a diagonal gradient.

* * * * *